Sept. 5, 1967  J. J. GREVICH  3,340,129
SEALING APPARATUS

Filed July 28, 1964  3 Sheets-Sheet 1

INVENTOR
JOHN J. GREVICH
BY Williamson & Palmatier
ATTORNEYS

Sept. 5, 1967  J. J. GREVICH  3,340,129
SEALING APPARATUS
Filed July 28, 1964  3 Sheets-Sheet 2
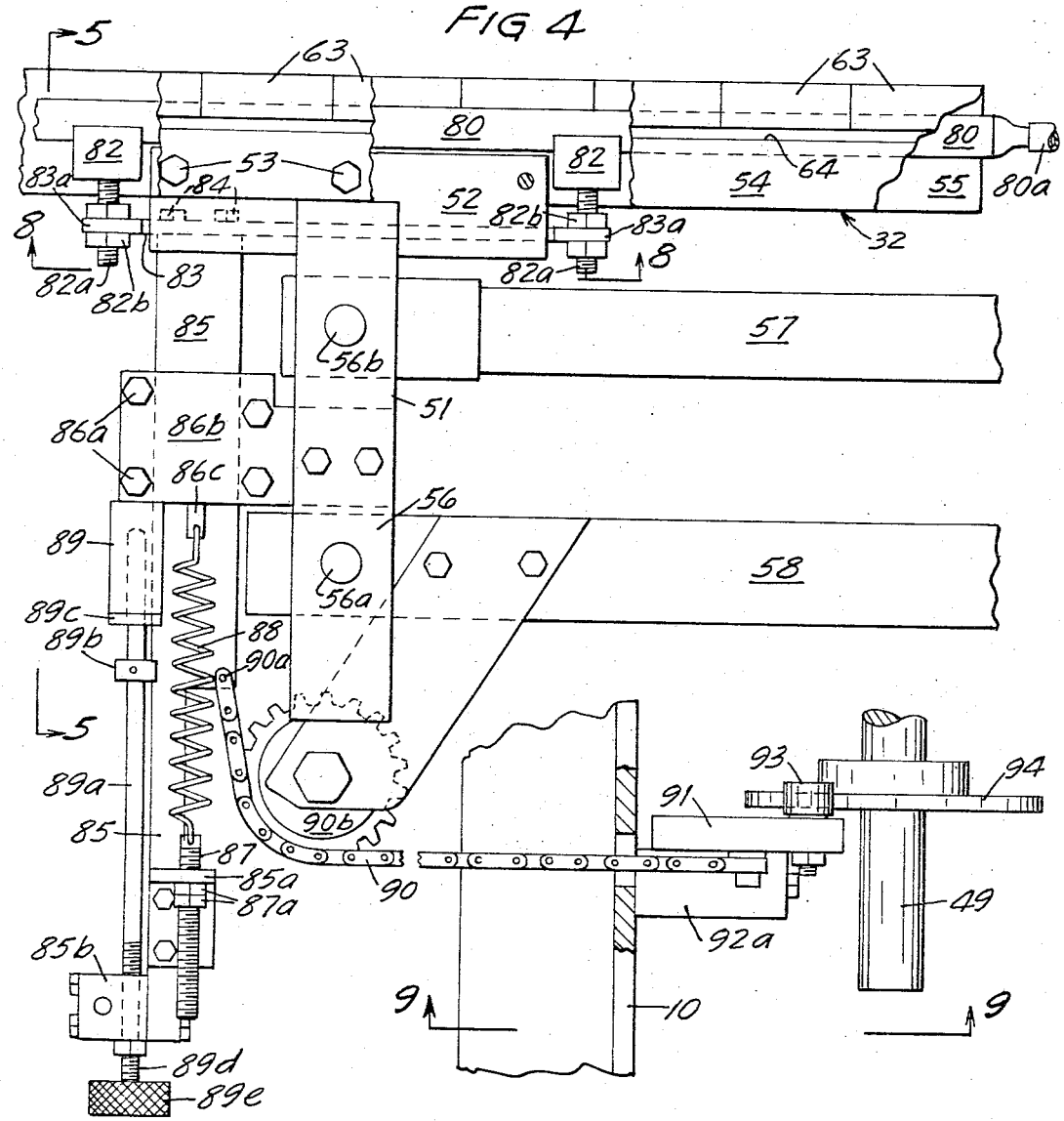
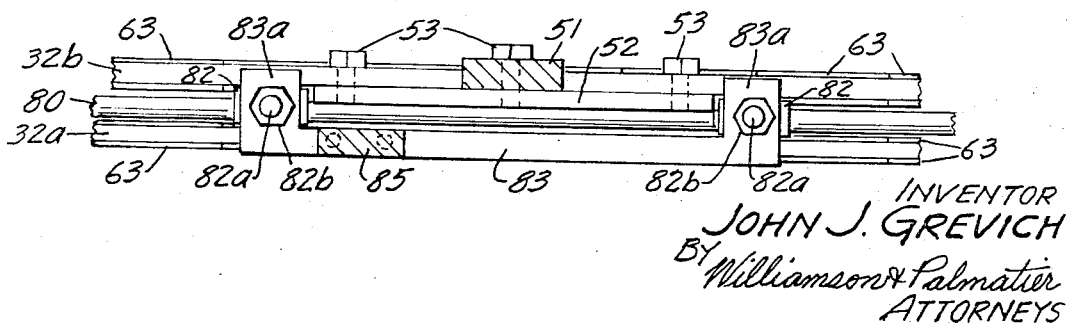
INVENTOR
JOHN J. GREVICH
BY Williamson & Palmatier
ATTORNEYS Sept. 5, 1967      J. J. GREVICH      3,340,129
SEALING APPARATUS
Filed July 28, 1964      3 Sheets-Sheet 3
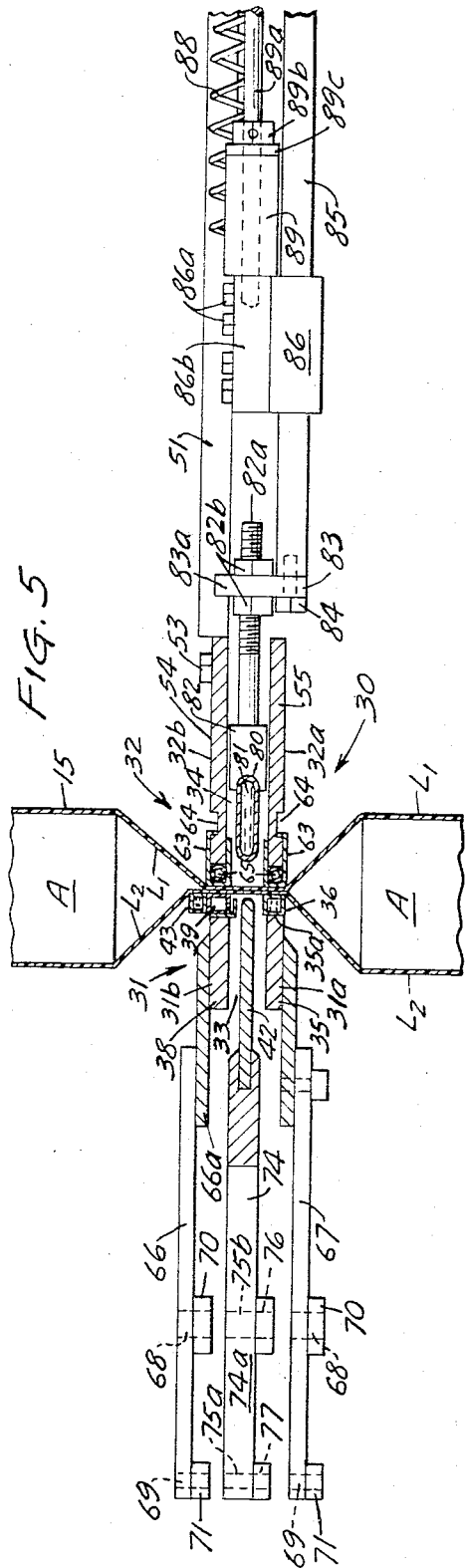
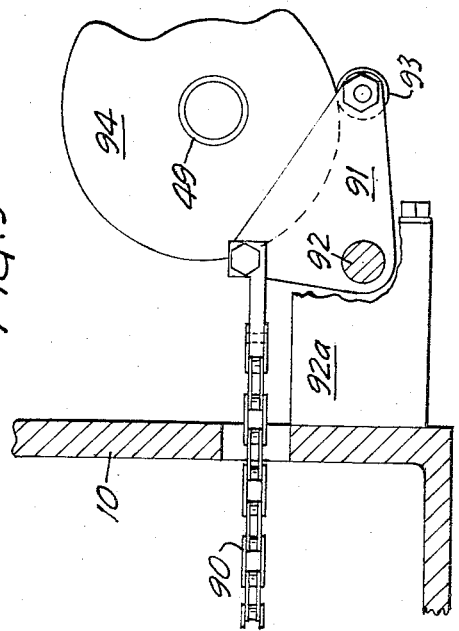
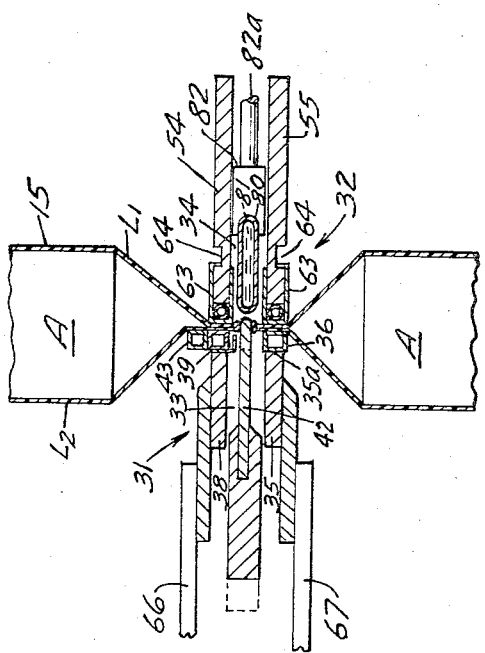
INVENTOR
JOHN J. GREVICH
BY Williamson & Palmatier
ATTORNEYS United States Patent Office 3,340,129
Patented Sept. 5, 1967

3,340,129
SEALING APPARATUS
John J. Grevich, Star Prairie, Wis., assignor to Doughboy Industries, Inc., New Richmond, Wis., a corporation of Wisconsin
Filed July 28, 1964, Ser. No. 385,623
2 Claims. (Cl. 156—498)

This invention relates to apparatus for forming packages of heat sealable sheet material such as polyethylene and the like.

In the formation of packages of heat sealable sheet material, it may be entirely closed packages or open ended bags, one of the limiting aspects in the formation of such packages has been the cooling of the seals or welds along the edges of confronting laminae which have been sealed or welded together.

Because of the time required for cooling the seals to effect hardening and strengthening of the material at the sealed edges, the rate at which packages have been formed has been materially limited.

With these comments in mind, it is to the elimination of these and other disadvantages in the prior art to which the present invention is directed along with the inclusion therein of other novel and desirable features.

An object of the invention is to provide an apparatus for rapidly severing confronting laminae of heat sealable material and substantially simultaneously sealing together the edges produced in the severance and effecting rapid cooling of the edges which have been severed and sealed to cause rapid hardening and strengthening of the sealed edges sufficiently as to confine an article within the package being formed.

Another object of the invention is to provide a new and novel apparatus for rapidly cooling the edge of confronting heat sealable laminae which have been formed by application of a heated sealing bar, the cooling of such edge being effected by physically engaging the sealed edges with a chilled or cooled element immediately after the heated bar has been withdrawn from engagement with the sealed edges.

The further object of the invention is the provision in a package forming apparatus wherein confronting laminae of heat sealable material are substantially simultaneously severed and sealed together along the edges produced in the severance by passing a heated bar through the confronting laminae, and wherein the confronting laminae are clamped together and cooled by chilled clamping jaws to thereby chill the entire area of the laminae adjacent the seals produced by the heated bar and cooperating with a cooled heat absorbing element which physically engages the sealed edges immediately after the heated bar is withdrawn from engagement with the sealed edges.

These and other objects and advantages of the invention will more fully appear from the following description made in connection with the accompanying drawings, wherein like reference characters refer to the same or similar parts throughout the several views, and in which:

FIG. 4 is an enlarged detail plan view partly broken away and shows in detail certain of the mechanisms shown generally in FIG. 2.

FIG. 5 is an enlarged detail section view taken approximately at 5—5 in FIG. 4 and showing the clamping jaws closed onto the heat sealable sheet material and illustrating the heated bar at a position intermediate the limits of its movement and more specifically illustrates the heated bar as it is just about to engage and sever the sheet material and seal the edges produced in the severance.

FIG. 6 is an enlarged detail section view similar to a portion of FIG. 5 and illustrates shifted positions as compared to those illustrated in FIG. 5.

FIG. 8 is a detail section view taken at 8—8 of FIG. 4.

FIG. 9 is an enlarged detail section taken at 9—9 in FIG. 4.

Figure 1:
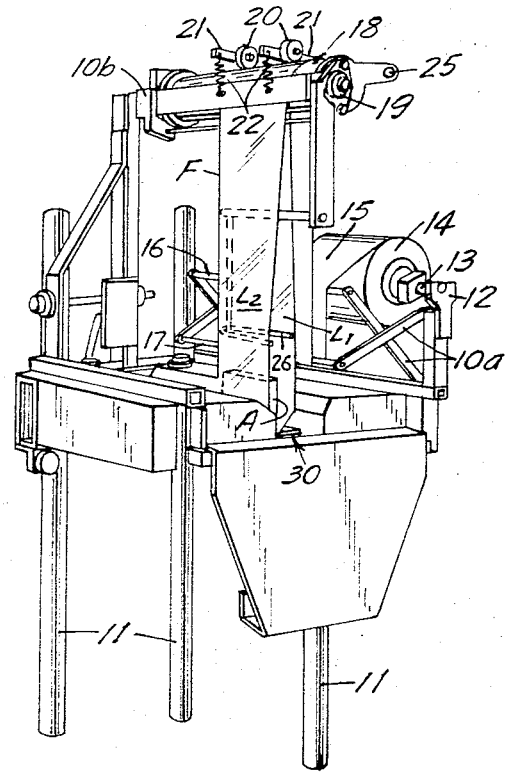
FIG. 1 is a perspective view illustrating the general nature of a machine embodying the invention.
Figure 3:
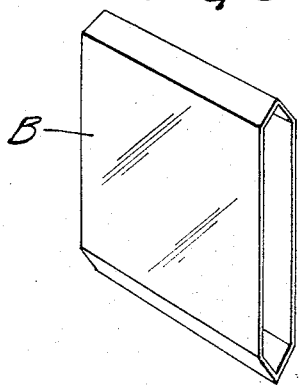
FIG. 3 is a perspective view of a package formed.

In FIG. 1 is illustrated a frame structure 10 including supporting legs 11. The frame structure has bearings 12 thereon journalling the central spindle 13 of a roll 14 of polyethylene sheet material. The strip 15 of polyethylene forming the roll 14 is folded longitudinally of the side F of the strip so that the edges E form the other side of the strip 15 of polyethylene sheet material. The strip 15 of sheet material thereby defines confronting laminae L1 and L2 which are joined together along the folded side F of the strip. By severing lengths of the strip and sealing the edges formed in the severance, packages in the forms of bags, as illustrated at B in FIG. 3 are formed. It will be understood that by sealing across the open ends of the bags, closed packages may be formed.

The strip 15 is guided over rollers 16 and 17 which are journalled on frame elements 10a. The strip 15 is then trained over a drive roll 18 which is journalled in bearings 19 on the upper portion 10b of the frame. Pressure rollers 20 are journalled on mounting bars 21 and are urged downwardly by springs 22 to maintain the pressure rollers against the strip 15 as it passes over the drive roll 18. The mounting bars 21 are affixed to a mounting shaft 25 adjacent and parallel to the drive roll 18.

The drive roll 18 will be intermittently rotated for pulling the strip 15 of polyethylene sheet material off the roll 14 and supplying the strip 15 downwardly, along the spreader 26, as seen in FIG. 1 to facilitate insertion of an article A between the confronting laminae L1 and L2 of the strip.

Figure 2:
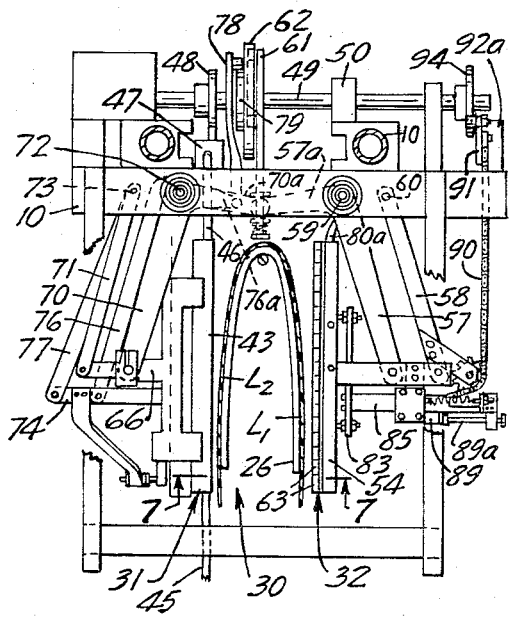
FIG. 2 is a section view taken on a horizontal plane and illustrating the apparatus for clamping, severing and sealing the heat sealable sheet material bags or packages and chilling the seals produced in the severance.
Figure 7:
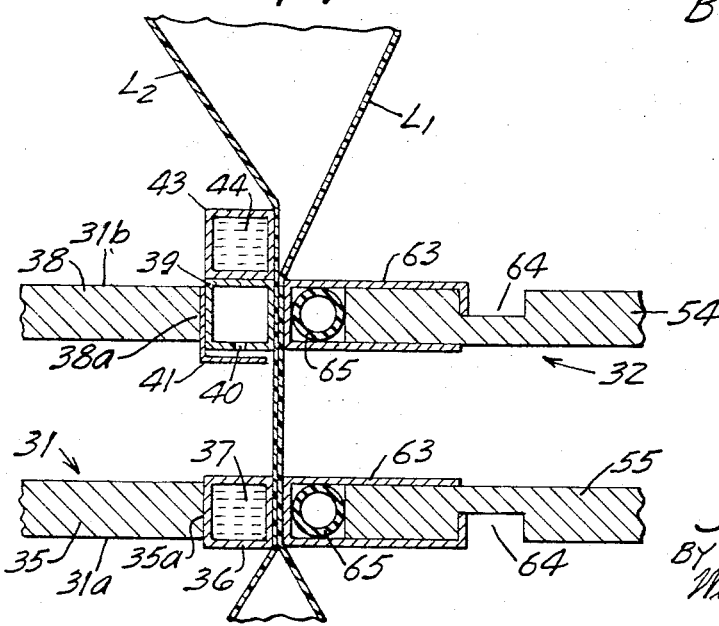
FIG. 7 is a greatly enlarged detail section view taken at 7—7 in FIG. 2, with certain parts shifted.

The sheet material clamping, severing and sealing apparatus, indicated in general by numeral 30, is disposed below the spreader 26 and is illustrated in general at FIG. 2. The apparatus 30 includes a pair of elongate rigid clamping jaws 31 and 32. Each of the jaws 31 and 32 has a pair of spaced and parallel clamping members 31a, 31b, and 32a, 32b, each of which is disposed opposite in edge to edge relation to a corresponding clamping member of the other jaw. It will also be seen that the jaws 31 and 32 have unobstructed spaces 33 and 34 opposite each other at opposite sides of the clamped laminae and between the corresponding clamping members of the jaws.

The clamping member 31a of jaw 31 comprises a rigid bar 35 having a forward edge portion 35a with a square liquid carrying tube or conduit 36 affixed thereon and carrying a chilled coolant 37 such as water therethrough. The conduit 36 is constructed of heat conducting metal and may be stainless steel for physically engaging the polyethylene sheet material and effecting cooling thereof. The tubing 36 may be affixed to the bar 35 as by welding.

The clamping member 31b of jaw 31 also includes a rigid bar 38 having a forward edge portion 38a to which is affixed, as by welding, a rigid heat conductive metal tubing or conduit 39 having a plurality of apertures 40 therein all along its length and disposed at the bottom or lower side of the tube 39. The tube 39 carries cooling air which is discharged all along its length at the apertures 40. A deflector plate 41 is spaced slightly from the apertures 40 in fixed positions to direct the air forwardly and toward the polyethylene sheet material for cooling the sealed edges, and to prevent the air from materially cooling the heated sealing bar 42 which passes through the unobstructed space 33 of jaw 31 into engagement with the clamped laminae L1 and L2.

A heat absorbing metallic tube or conduit 43 is affixed as by welding in overlying relation with the tube 39 on the clamping member 31b and carries chilled coolant 44, such as water, to cool the polyethylene strip during clamping. The chilled coolant is circulated to and from the ends of the conduits 36 and 43 by hoses 45. Air is supplied to the conduit 39 by hose 46 which is connected to an air valve 47 controlled by a cam 48 operating drive shaft 49, which as seen in FIG. 2, is journalled in bearings 50 on the frame 10. As the shaft 49 slowly revolves for each operational cycle of the machine, the air valve 47 is opened as the heated bar 42 is withdrawn from engagement with the severed and sealed edges of the laminae L1 and L2, thereby directing air at the sealed edges to effect cooling thereof. The cam 48 effects closing of the air valve 47 again substantially simultaneously with the opening of the jaws 31 and 32 as hereinafter described. The air remains off until the heated bar has effected severing and sealing again and is being withdrawn.

The jaw 32 includes a T-shaped mounting bracket 51 having a forward cross bar portion 52 extending parallel with the jaw 32 and projecting between the clamping members 32a and 32b thereof. The cross bar 52 is affixed as by cap screws 53 to the rigid bars 54 and 55 of clamping members 32b and 32a respectively. The bracket 51 has an elongate stem portion 56 extending substantially horizontal and normal to the jaw 32 and is pivotally connected at the pivots 56a and 56b to parallel arms 57 and 58. Arms 57 and 58 are mounted on pivots 59 and 60 to the frame 10 of the machine so as to continuously maintain the jaw 32 in a predetermined orientation. As hereinafter pointed out the jaws 31 and 32 are maintained parallel for effectively clamping the polyethylene laminae together.

The parallel arm 57 has the inner end 57a thereof connected to a cam operated slide 61 controlled by cam 62 on the shaft 49. As the cam 62 revolves with the shaft 49 during each operational cycle, the jaw 32 is sequentially moved inwardly and outwardly to cooperatively effect clamping of the polyethylene sheet material. It will be noted that the clamping members 32a and 32b also include slide elements or clips 63 slidably mounted on the inner edge portions of rigid clamping bars 54 and 55. The slides 63 are relatively short and engage each other in end to end relation all along the length of the clamping members 32a and 32b. The clips 63 actually define the material-engaging edge portions of the clamping members 32a and 32b; and the movement of the clips 63 is restricted by end inwardly protruding lips 63a in grooves 64 of the bars 54 and 55. Inwardly sliding movement of the clips 63 is restrained by rubber tubes or hoses 65 confined within the clips and bearing against the forward edges of bars 54 and 55.

The clamping members 31a and 31b of the jaw 31 moved toward and away from the corresponding members of jaw 32 and are maintained parallel thereto. T-shaped mounting brackets 66 and 67 respectively mount the upper and lower clamping members 31a and 31b of the jaw 31 and are rigidly affixed to the bars 38 and 35 thereof by connection plates 66a and 67a respectively. The plates 66a and 67a are welded to the respective bars 38 and 35 and to the brackets 66 and 67. Each of the brackets 66 and 67 is connected at pivots 68 and 69 respectively to parallel mounting arms 70 and 71 respectively. The parallel swinging arms 70 and 71 are swingably connected to the frame on pivots 72 and 73 respectively. The arms 70 have obliquely extending end portions 70a which are connected, along with the end portion 57a and arm 57 to the cam-controlled slide 61. It will therefore be understood that as the cam 62 is revolved with control shaft 49 the cooperating jaws travel inwardly and outwardly for respectively clamping and releasing the confronting film laminae L1 and L2.

The heated sealing bar 42 is heated by known means such as electric resistance wires, and is also carried on T-shaped mounting brackets 74, the outwardly extending stem portion 74a of which is connected by pivots 75a and 75b to parallel mounting arms 76 and 77 the opposite ends of which are also pivotally mounted on pivots 72 and 73 respectively. Arm 76 has an obliquely extending end portion 76a which is connected to a cam controlled slide 78 to be moved by a rotary cam 79 on the shaft 49. It will be understood that the cam 79 produces movement of the heated sealing bar 42 through the unobstructed space 33 of jaw 31 and into engagement with the clamped laminae for severing and sealing the clamped laminae and then into the unobstructed space 34 of jaw 32, after which the sealing bar 42 is withdrawn.

With particular emphasis on FIG. 4 the present invention provides apparatus for physically engaging the edges of the laminae L1 and L2 which have been produced and sealed by the heated bar 42, for immediately cooling the edges after the bar 42 is withdrawn out of engagement therewith.

An elongate rigid heat absorbing element or conduit 80 extends longitudinally of the jaw 32 and through the unobstructed space 34 therein. It will be noted that the tube 80, constructed of metal, has a flattened shape, and contains a chilled coolant 81 continuously following therethrough to maintain the tube in cool condition. Normally the tube is retained in retracted position as seen in FIG. 5 and in full lines in FIG. 6, but immediately after the heated bar 42 is withdrawn from engagement with the sealed edges of the laminae L1 and L3, essentially at the dotted line position illustrated in FIG. 6, the tube 80 is thrust toward the sealed edges of the laminae for engaging these edges and immediately absorbing the welding heat therein to harden and strengthen the sealed edges. It will be noted that the tube 80 is somewhat thicker than the sealing bar 42 so as to assure engagement by the tube with the sealed edges of the laminae.

The ends of tube 80 are connected as by hoses 80a to a source of chilled coolant, such as water.

A plurality of mounting brackets 82 are affixed to the tube 80 as by brazing and the mounting brackets 82 have threaded studs 82a thereon and projecting rearwardly therefrom. The threaded studs are connected by nuts 82b to upstanding ears 83a at the opposite ends of the elongate connecting plate 83 which underlies the bracket 51 and is spaced from the cross member 52 of the jaw mounting bracket 51. Mounting plate 83 is connected as by cap screws 84 to the end of an elongate slide plate 85. Slide plate 85 is slidably mounted in slide bearings 86 which are affixed as by cap screws 86a to a mounting plate 86b affixed as by screws to the stem portion 56 of jaw mounting bracket 51.

Slide plate 85 has an apertured upstanding mounting ear 85a affixed thereon and adjustably carrying a threaded stud 87 retained by lock nuts 87a. The slide-moving spring 88 is connected at one end to the adjustable stud 87 and is connected at the other end to an anchor post 86c which is rigidly affixed as by welding to the plate 86b. It will therefore be seen that the slide plate 85 and heat absorbing tube 80 are continuously urged forwardly by spring 88. Forward movement is limited by a hollow stop 89 affixed to the plate 86b and slidably carrying stop rod 89a to which is affixed a stop collar 89b which confronts a cushion 89c on the end of stop 89. The stop rod 89a has a threaded rear end portion 89d adjustably mounted in a threaded opening in block 85b which is affixed to the slide pate 85. The rod 89a has a knurled handle 89e thereon to control rotation of the rod and longitudinal adjustment of it with respect to the block 85b and slide plate 85. The forward limit of movement of the slide and cooling tube 80 is thereby carefully controlled.

Rearward movement of the slide and tube 80 is effected by operation of a roller chain 90 connected at pin 90a to the slide plate 85. The chain 90 is trained over sprocket 90b which is journalled on a bracket rigid with arm 58, and extends outwardly of the frame and is connected at its other end to the upper portion of a rocker arm 91 which is connected by pivot 92 to a frame block 92a. A cam follower 93 engages a rotary cam 94 on the shaft 49. Operation of the slide 85 and cooling tube 80 is virtually unaffected by inward and outward movement of jaw 32. Rotation of shaft 49 and cam 94 permits spring 88 to move the slide 85 forwardly and move the cooling tube 80 into engagement with the sealed edges of the heat sealable film material immediately following withdrawal of the sealing bar 42 so that the welding heat applied by the sealing bar 42 to the edges of the film material is immediately absorbed by the tube 80. Subsequently, the cam 94 effects withdrawal of the tube 80 from the dotted line thereof shown in FIG. 6 to the full line position shown, after which the jaws 31 and 32 are separated to release the package there below and to allow the article A there above to pass downwardly between the jaws together with the portion of strip 15 confined with article A so the strip may again be severed in the manner described.

It will, of course, be understood that various changes may be made in the form, details, arrangement and proportions of the various parts without departing from the scope of the invention.

I claim:

1. An apparatus for producing packages from laminae of heat sealable material, means presenting a pair of the laminae in confronting relation with each other, clamping means including first and second cooperating laminae-clamping jaws each having a pair of elongate parallel clamping members spaced from each other to define an unobstructed space therebetween, each of said members being disposed opposite a corresponding member of the other jaw, said jaws effecting clamping of elongate juxtaposed and spaced portions of the laminae, the clamping members of one of said jaws having material-engaging edge portions confronting the other jaw, said edge portions having means effecting cooling thereof for absorbing heat from the clamped laminae engaged thereby, a heated bar extending along said first jaw and having a temperature in excess of the melting temperature of the heat sealable materials, said bar being movable through the unobstructed space of said first jaw and toward the clamped laminae, an elongate, cooled and heat absorbing element extending along said second jaw for movement through said unobstructed space thereof and toward said clamped laminae, said heat absorbing element having a temperature substantially below the melting temperature of the heat sealable material, means thrusting said heated bar forwardly through the unobstructed space of said first jaw and through the clamped laminae into the unobstructed space of said second jaw, said heated bar effecting severing of the clamped laminae by melting and also effecting sealing by welding of the edges produced in the severance, and said last mentioned means also withdrawing said heated bar from the second jaw and out of engagement with the sealed edges of the clamped laminae, means thrusting said heat-absorbing element through said unobstructed spaces and into heat absorbing engagement with the sealed edges of the clamped laminae and thrusting said heat absorbing element into close proximity with the rearwardly withdrawing heated bar to thereby quickly effect strengthening and hardening of the sealed edges, and said last mentioned means also effecting withdrawal of said heat absorbing element out of the unobstructed space of said first jaw and out of engagement with the sealed edges, and said material engaging edge portions of one of said clamping members including an air conduit directing air onto the sealed edge produced by welding and causing the air to sweep across said edge and effect rapid cooling, hardening and strengthening thereof.

2. The invention set forth in claim 1 wherein said first jaw includes said air conduit along the material engaging edge portion of one of the clamping members thereof, the heated bar being thrust forwardly toward the clamped laminae and through the unobstructed space of said first jaw and adjacent said air conduit, air deflector means on said first jaw and extending along said air conduit and directing air forwardly toward the sealed edges of the clamped laminae and away from said heated bar to effect cooling of the edges and to minimize cooling of the heated bar.

References Cited

UNITED STATES PATENTS

| 2,289,618 | 7/1942 | Young | 156—282 X |
| 2,606,850 | 8/1952 | Piazze | 53—373 X |
| 2,698,273 | 12/1954 | Miner et al. | 156—282 |
| 2,928,220 | 3/1960 | Kannengresser et al. | 53—39 X |
| 3,017,314 | 1/1962 | Kebekus et al. | 156—515 X |
| 3,050,916 | 8/1962 | Gausman et al. | 53—182 |
| 3,161,001 | 12/1964 | Gevich et al. | 53—182 |

FOREIGN PATENTS

| 835,306 | 5/1960 | Great Britain. |

ROBERT C. RIORDON, *Primary Examiner.*

FRANK E. BAILEY, *Examiner.*

N. ABRAMS, *Assistant Examiner.*